Jan. 13, 1959    P. KLAMP    2,868,139
POWER AND FREE CONVEYOR SYSTEM
Filed July 30, 1956    8 Sheets-Sheet 2

FIG-2

INVENTOR
PAUL KLAMP
BY Whittemore, Hulbert
Belknap
ATTORNEYS

Jan. 13, 1959    P. KLAMP    2,868,139
POWER AND FREE CONVEYOR SYSTEM
Filed July 30, 1956    8 Sheets-Sheet 5

INVENTOR
PAUL KLAMP
BY Whittemore, Hulbert &
Belknap
ATTORNEYS

United States Patent Office 2,868,139
Patented Jan. 13, 1959

2,868,139

POWER AND FREE CONVEYOR SYSTEM

Paul Klamp, Detroit, Mich., assignor to Mechanical Handling Systems, Inc., Detroit, Mich., a corporation of Michigan Application July 30, 1956, Serial No. 601,001

33 Claims. (Cl. 104—88)

The present invention relates to improvements in a conveyor system of the power and free type, of the general sort illustrated and described in the copending application, Serial No. 513,452, filed June 6, 1955, of Leonard J. Bishop and Paul Klamp, characterized by a main, chain operated set of trolley advancing power lugs or dogs traversing an endless overhead track, and a plurality of work supporting trolleys traversing a like track beneath said overhead track, and advanced by the chain actuated trolley components.

The invention more particularly deals with automatic exit switch provisions whereby work supporting trolleys so advanced may be switched onto a branch track running at an angle to the track provisions mentioned above.

It is general object of the invention to provide an improved exit switch mechanism for a power and free conveyor system as described, in which the operation of the switch mechanism is controlled and powered throughout by the main track chain, the switch being entirely free of special pneumatic and/or electrical control and operating means such as have heretofore been relied on in related systems.

Another object is to provide an automatic exit switch mechanism which consists of extremely simple but rugged and reliably acting mechanical parts which are foolproof in their operation and are inherently capable of a long life of unimpaired service.

More specifically it is an object to provide a mechanical switch mechanism including a pivoted switch tongue or frog controlling the transfer of work supporting trolleys from a main overhead track onto a branch track at 90° thereto, for certain operations to be performed on work supported by the trolleys, which tongue is normally spring urged toward a position to so divert the trolleys, but is latched in position, in opposition to the spring action, to guide the trolleys past the switch point and along the main conveyor track. Signal stations are associated with the conveyor in advance of and to the rear of the switching station or point, in an arrangement similar to that involved in the copending application identified above, and the action of these signal stations conditions the latch device under the control of the trolleys themselves, whereby a trolley will be diverted onto the branch track only after a preceding trolley in the branch has departed from the operating station on that track. By the same token, the latching mechanism is reset or recocked automatically as the diverted trolley enters onto the branch track, placing the switch mechanism in condition for a subsequent operation.

Another object of the invention is to provide an exit switch mechanism as described, in which the latch device comprises pivoted latch members individually controlled by the respective advance and rear signal stations so that, dependent upon the setting of appropriate tappet pins or lugs on the individual work supports advanced by the trolleys, the switch mechanism may be conditioned to divert certain trolleys onto the branch track, while allowing other trolleys to proceed without switching onto the main track.

Yet another specific object is to provide an exit switch mechanism of the above sort, in which a switch tongue is pivotally mounted adjacent the point of divergence of main and branch track sections, facing oppositely of the direction in which the tracks diverge, and in which the tongue has associated therewith a lost motion control lever arm, by which the tongue is reset in opposition to a power spring to a closed position of the tongue, allowing the trolleys to proceed without switching on the main track. The lost motion tongue extension is held, as described, by a latch device, and progressive release of individual latch members from the tongue extension conditions the same for operation by a power spring to its open, trolley switching position.

A still further object is to provide an exit switch mechanism of the sort described, in which the transfer of trolleys past the switch mechanism and onto a branch track is effected in a positive fashion by a switching chain which, in common with the operation of the switch mechanism as a whole, is powered directly from the chain driven trolley system, by engagement of lugs or dogs on said transfer chain in a caterpillar fashion with the links of the overhead main track trolley advancing chain.

The foregoing as well as other objects will be made more apparent as this description proceeds, especially when considered in connection with the accompanying drawings, wherein.

Figures 1, 1A:
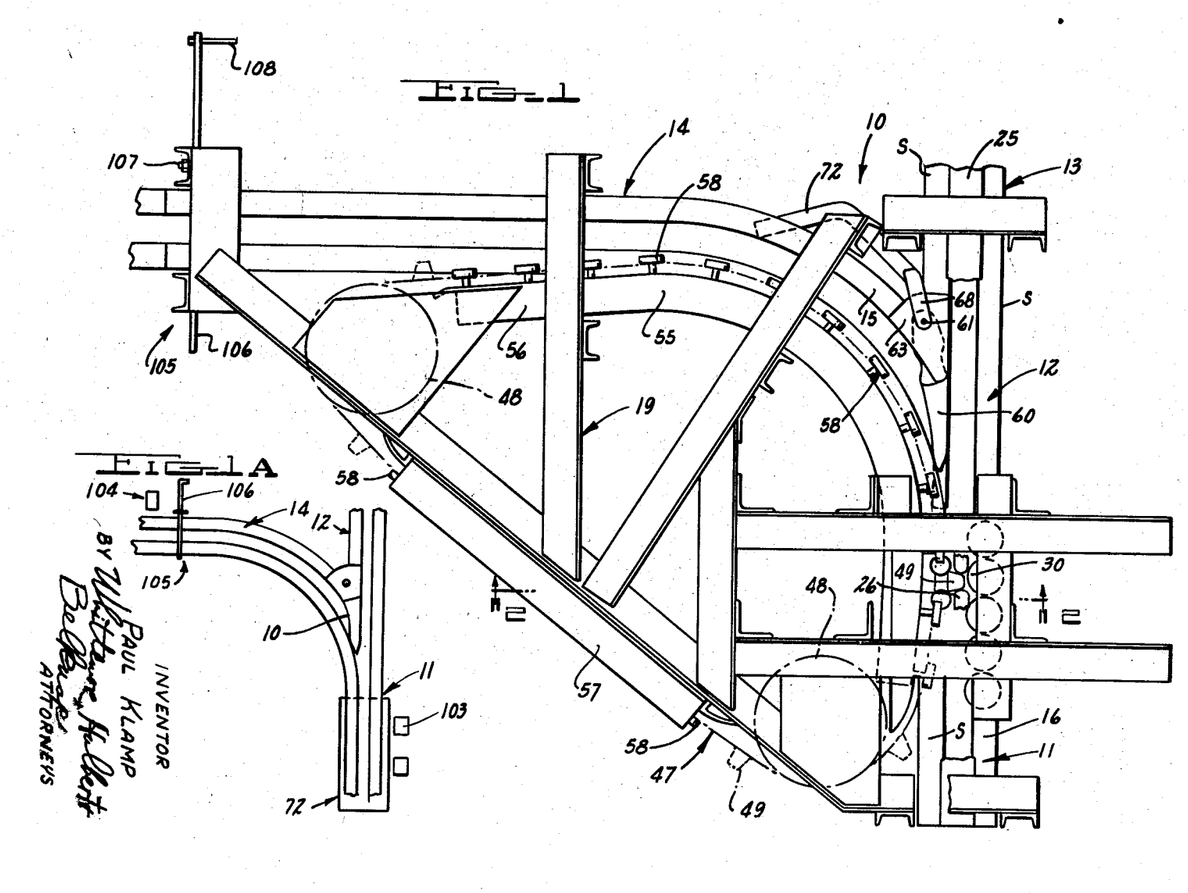
Fig. 1 is a fragmentary top plan view generally showing the layout of the exit switch mechanism in relation to main and branch track sections of the conveyor, as well as to the auxiliary or transfer chain of the apparatus.
Fig. 1A is a fragmentary top plan view, schematic in nature, showing the arrangement of the structure of Fig. 1 in reference to signal stations alongside the main track and branch track sections, respectively, forwardly and rearwardly of the switch mechanism.
Figure 2:
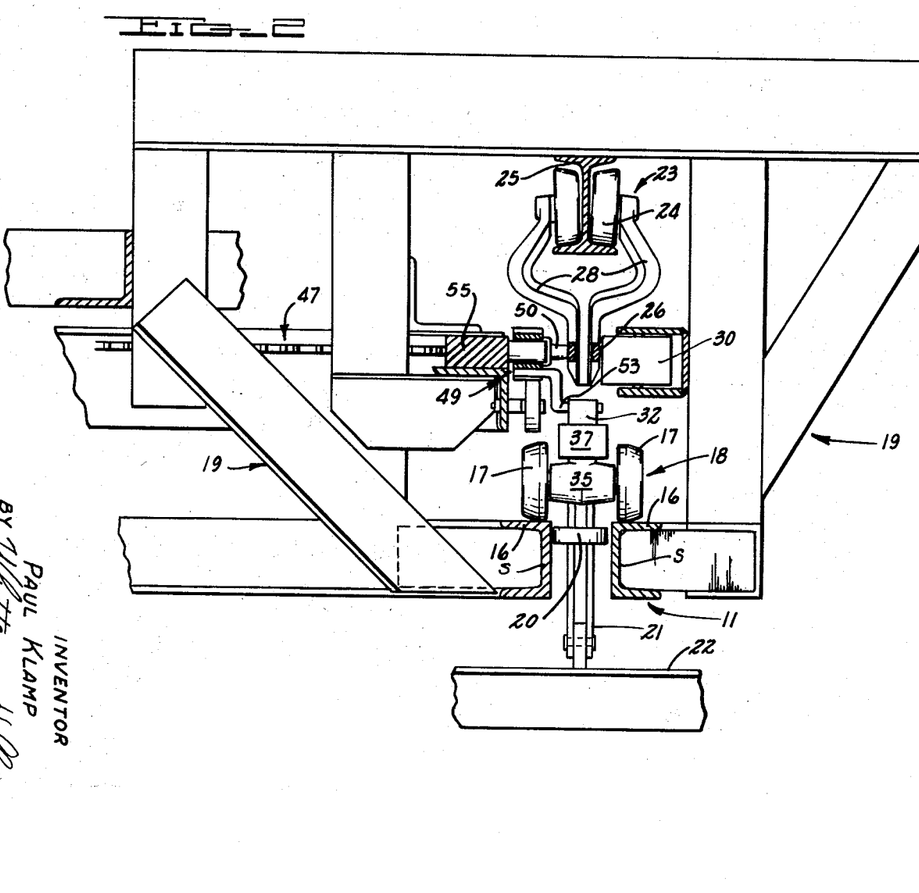
Fig. 2 is a fragmentary view in enlarged scale along the section line 2—2 of Fig. 1.
Figure 3:
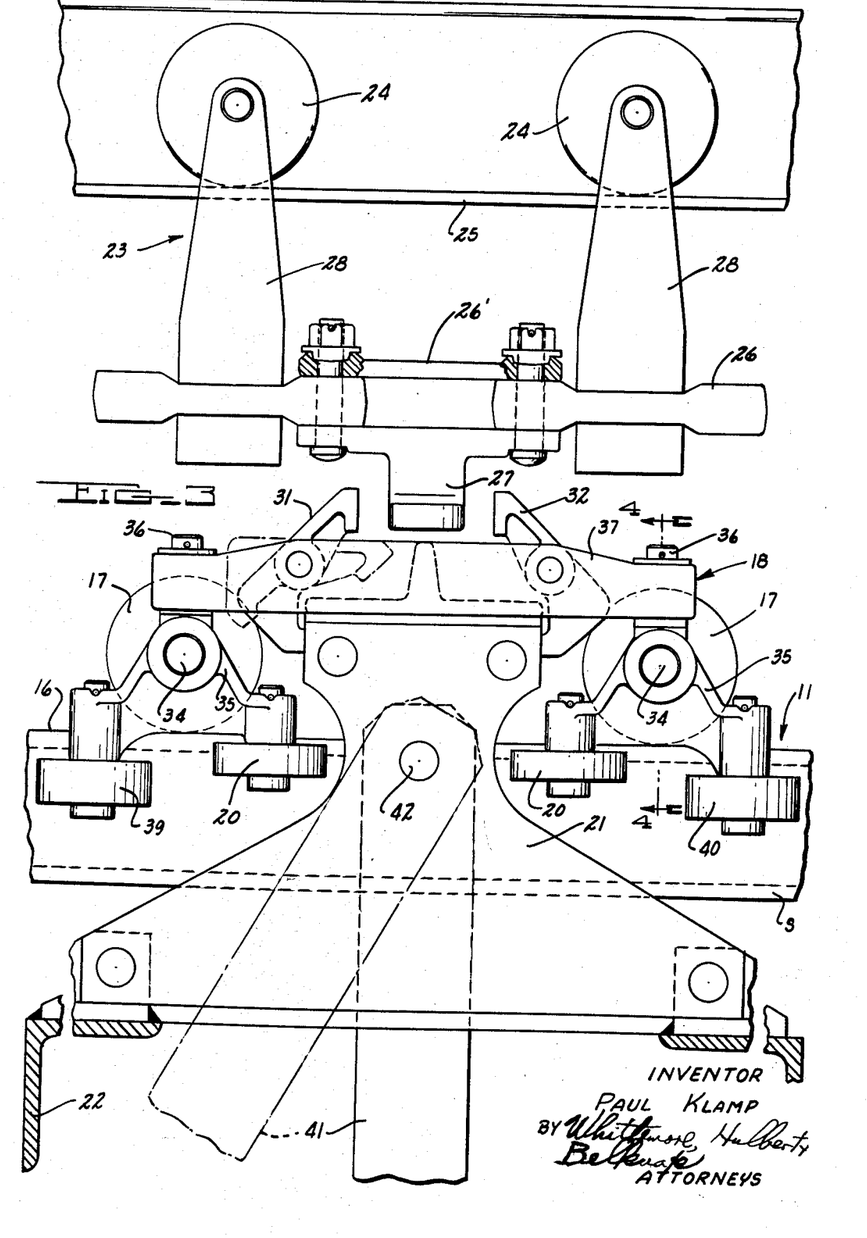
Fig. 3 is a fragmentary view in side elevation, partially broken away and in vertical section, showing a trolley assembly as employed in the invention and its provisions for supporting and advancing the same along vertically spaced track sections of the main overhead track system.

Referring first to Figs. 1, 1A and 2 of the drawings, the improved exit switch mechanism of the invention is generally designated 10, and its function is to control the travel of work supporting trolley units in reference to leading and trailing sections 11, 12, respectively, of a main trolley supporting track, generally designated 13, and in reference to a branch track section 14 disposed at a 90° angle to the track 13. As indicated in Fig. 2, the track sections 11, 12 and 13 are constituted by opposed channel sections S disposed with their web portions face to face. The branch track 14 terminates adjacent the switch mechanism 10 in a curved portion which is designated 15. The upper horizontal flanges 16 of these sections provide track surfaces for the load supporting wheels 17 of trolleys 18, such as are shown in Fig. 3 and will be hereinafter referred to.

The structure as described is supported in an overhead position in a well known manner, by horizontal and vertical angle iron work, generally designated 19.

Each trolley 18 includes a plurality of guide rollers 20 which travel between the track section webs as well as with a hanger 21 from which a load support depends, this support including a conventional bumper 22 of rectangular outline. Other guide rollers of the trolley will be hereinafter referred to.

The reference numeral 23 generally designates an upper work advancing trolley whose rollers 24 travel along the horizontal flanges of an elongated track beam 25 constituting a part of the main track structure 13. The trolleys are advanced by an endless chain 26 whose links they engage at longitudinally spaced points, and as shown in Fig. 3, certain of these links, specially designated 26', are provided with depending driving lugs 27 for the purpose of advancing the trolleys 18 around the main track section 13. Upper trolley rollers 24 are connected to the chain 26 by depending arms 28 which are appropriately secured to the chain.

As shown in Figs. 1 and 2, the chain 26 may be sustained along its side by backing rollers 30 journaled on vertical trunnions on the main track section 11, forwardly of the exit switch mechanism 10.

Referring now to Fig. 3, the work supporting trolley 18 is shown in its normal operating relation to the trolley advancing chain 26, in which the chain dog 27 extends downwardly between front and rear pivoted and counterweighted trolley dogs 31, 32, respectively, of a type generally similar to the trolley dogs shown in the copending application referred to. The load supporting rollers 17 are mounted by ball bearings 33 on cross shaft elements 34 fixedly carried by swivel mounts 35 of the trolley 18, and upright trunnion pins 36 on the pivotal mounts 35 permit the roller assembly to pivot relative to the trolley body or frame 37, as in rounding the branch track section 15. It will be noted by reference to Fig. 3, that there are two sets of the vertically journaled guide rollers associated with each trolley 18. These include forward and rearward rollers 39, 40, which are located at a lower elevation than the intermediate guide rollers 20, referred to above. The respective sets of guide rollers 20 and 39, 40 are carried by the swivel mounts 35 of the trolley; and the pair of rollers 39, 40 project, respectively, forwardly and rearwardly of the load supporting rollers of the trolley, as well as its frame 37. Their function is to operate the switch tongue resetting mechanism to be hereinafter described.

As shown in Fig. 3, a load supporting bar 41 is pivoted at 42 on each trolley hanger 21, swinging in a vertical plane as indicated in solid and dot-dash line.

Figure 7:
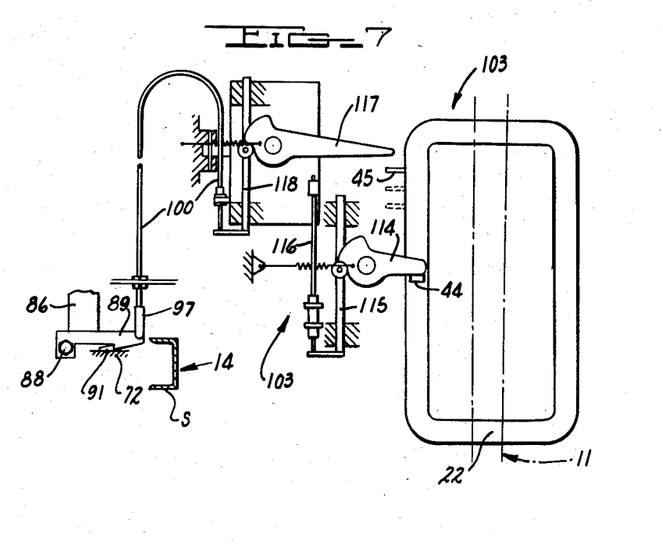
Figs. 7 and 8 are schematic views illustrating, respectively, signal stations associated with the main and branch trolley tracks of the system.
Figure 8:
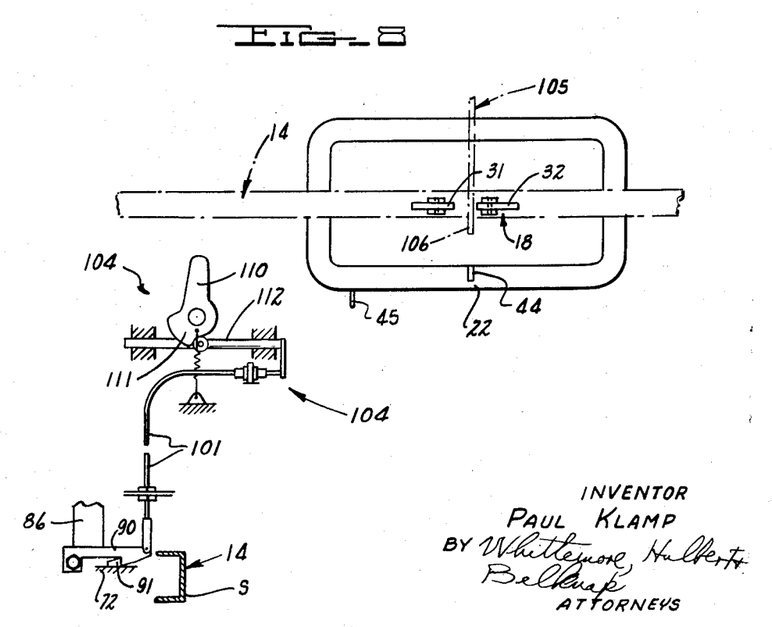

The bumper 22 on trolley hanger 21 is generally shown in Figs. 7 and 8 of the drawings. It is as shown in the copending application identified above, to which reference may be made, and includes a lug 44 which extends substantially above the main rectangular outline of the bumper; the function of the lug 44 will be hereinafter referred to. The bumper also carries an adjustable tappet pin 45 which extends from one side thereof and may be selectively positioned along the length of the bumper, as described in the copending application. The purpose of the pin 45 is hereinafter described.

Figures 4, 5, 6:
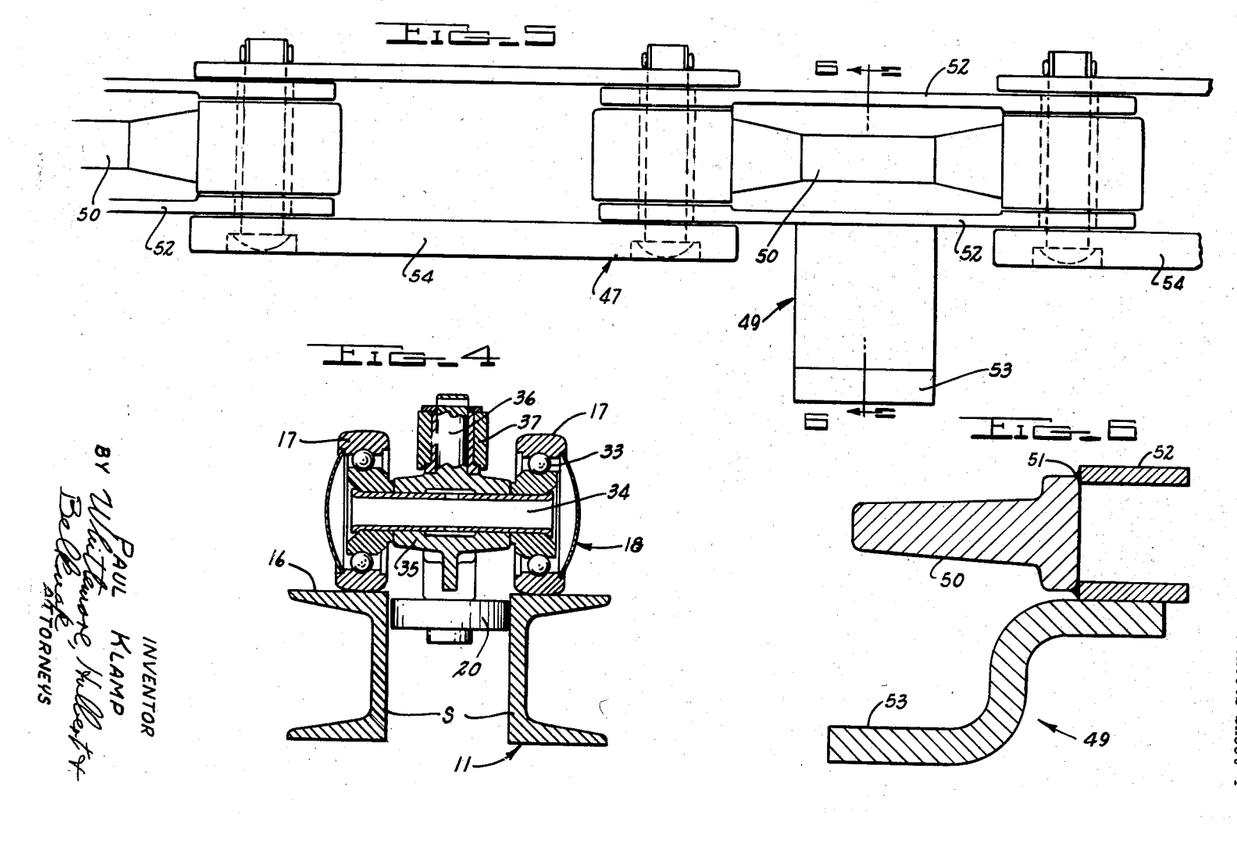
Fig. 4 is a view in vertical section along line 4—4 of Fig. 3.
Fig. 5 is a fragmentary side elevational view of a trolley transfer chain as incorporated in the improved exit switch mechanism.
Fig. 6 is a view in vertical section along line 6—6 of Fig. 5.

Referring again to Fig. 1 of the drawings, in conjunction with Figs. 2, 5 and 6, the reference numeral 47 generally designates a switch or transfer chain which is mounted adjacent the exit switch mechanism 10. This chain is located inwardly of the main track sections 11, 12 and the branch track section 14, being trained about end sprockets 48, as shown in Fig. 1. The chain 47 is driven in a caterpillar fashion from the main trolley advancing chain 26; and to this end it is provided, as shown in Figs. 5 and 6, with a series of laterally outwardly spaced driving dog units 49. Each such unit comprises a chain engaging lug or dog 50 welded at 51 to an open link unit 52 of the chain 47, and a downwardly spaced, laterally outwardly extending trolley engaging and forwarding lug 53, the lug 53 being of somewhat greater length, in the lateral sense, than the dog 50. On either side of the dog unit 49 there is an open link 54 of the chain 47 which is engaged by teeth of the respective sprockets 48, along with the links 52.

As illustrated in Figs. 1 and 2, the chain 47 is laterally backed up by a rounded guide way 55 which is concentric with the branch track portion 15. As it extends in the direction of track 14, the guide 55 is brought inwardly at 56 in an acute angle to the track section 14, for the purpose of gradually disengaging the trolley advancing dogs 53 of chain 47 from the trolleys engaged thereby. Otherwise, the chain 47 is guided at its oblique or hypotenuse reach by a suitable roller supporting unit, generally designated 57. Chain supporting rollers 58 mounted on the guide 55 also support the chain in its rounded portion as it passes from parallelism with main track section 11 around its arcuate reach and alongside the branch track section 14. Referring to Fig. 2 of the drawings, it is seen that the lateral dogs 50 of the individual chain dog units 49 are brought into engagement with links of the main trolley advancing chain 26 as the chain 47 comes into parallelism with the main track sections 11, 12. At the same time, the lower trolley advancing lugs 53 are brought into position between the forward and rearward trolley dogs 31, 32. Hence the chain 47 derives its continuous motion around a generally triangular path from the main power chain 26, so that the trolleys 18 are positively advanced from the main track section 11 onto the branch track section 14 in this fashion.

The operating spacing of the main drive chain dogs 27 and the transfer chain dogs 53 is sufficient that each dog 27 following a dog 53 will clear a load carrying trolley passing through switch 10. As the load carrying trolley is diverted tangentially from the main track 11, its dogs 31, 32 move laterally out of engagement with a dog 27. Being no longer propelled, the trolley slows until the transfer chain dog 53 catches up with and propels it into branch track 14.

Referring now to Figs. 9 through 14 of the drawings, in conjunction with Fig. 1 showing the general layout, the exit switch mechanism 10 of the invention comprises a forwardly facing switch tongue 60 (Figs. 9 and 12) which is pinned to a vertical shaft 61 journaled by upper and lower ball bearings 62 in a fixed switch frog mounting member 63, at the junction of the main and branch track sections 11 and 14, respectively. The mounting member 63 is of generally triangular outline (Fig. 9), being provided with rearwardly divergent bracket extensions 64, 65 by which it is bolted to the web portions of adjacent track beams of the respective track sections 11, 14, thereby locking the sections together at this switch zone. The switch tongue 60 extends forwardly, i. e. in the direction towards main track section 11, and is provided with an upwardly offset track portion 66 in the horizontal plane of the upper surface of the track sections 11 and 14. A lower guide and support arm 67 is formed integral with the tongue track portion 66 and extends substantially beyond the nose extremity in lateral openings in the webs of the respective track sections 11, 14, as the switch tongue 60 is swung from the solid position of Fig. 9, in which it closes the track opening to section 14, to the dotted line position in which the tongue portion 66 diverts an advancing trolley 18 into the branch track section 14, by engaging its depending guide rollers 20, 39 and 40.

Figures 12, 13, 14:
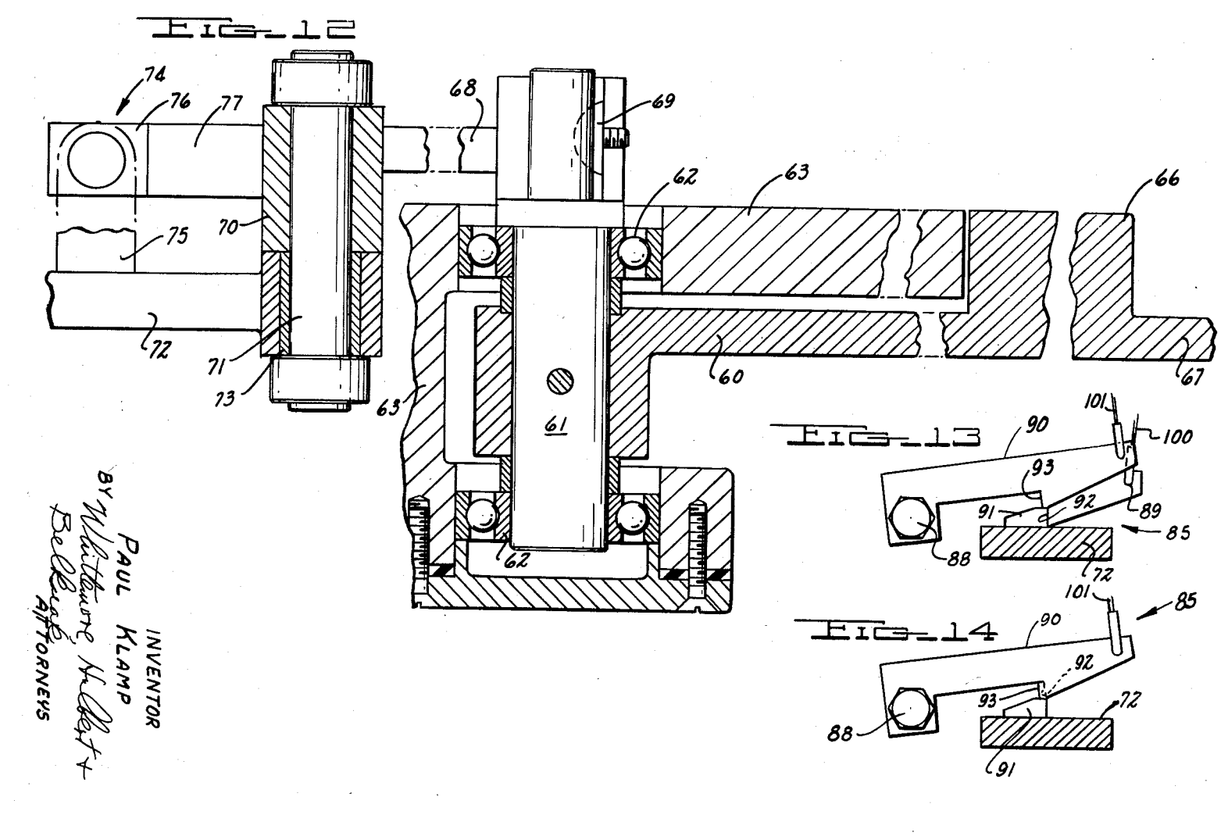
Fig. 12 is a fragmentary sectional view in enlarged scale, being partially broken away, of the switch tongue unit of the invention, as viewed along the broken line 12—12 of Fig. 9.
Figs. 13 and 14 are, respectively, views showing the latch device of Figs. 10 and 11 in different positions of its individually pivoted components.

As shown in Fig. 12, the shaft 61 to which tongue 60 is pinned has its upper emtremity above the mounting member 63, and a primary track extension arm or lever 68 is here secured to the shaft 61, as by a key 69. Hence tongue 60 and its extension arm or lever 68 swing as a unit with the shaft 61 as its axis. The primary tongue arm or lever 68 has an integral medial journal sleeve 70 which receives a hinge pin 71, and a secondary tongue actuating and control lever 72 is pivoted on the hinge pin 71, with a bushing 73 interposed. The secondary lever 72 is of angled outline (see Fig. 9) and it is operatively connected with the primary lever extension 68, hence with the switch tongue 60, by a resilient lost motion connection at 74. To this end, the secondary arm has an upright lug 75 welded thereto which extends into an outer fork aperture 76 on a continuation 77 of the primary lever arm 68. A coil spring 78 acts between the lug 75 on lever 72 and one of the fork arms 79 of the lever continuation 77, so as to urge the secondary lever 72 in a counterclockwise direction (as viewed in Fig. 9) about its hinge pivot pin 71, in reference to the primary lever 68 with which it is associated. The spring 78 is placed in compression when the secondary lever is swung clockwise about hinge pin 71 (Fig. 9) thus applying resilient force urging the primary lever 68, as a part of the tongue unit, about its pivot at shaft 61.

Figure 9:
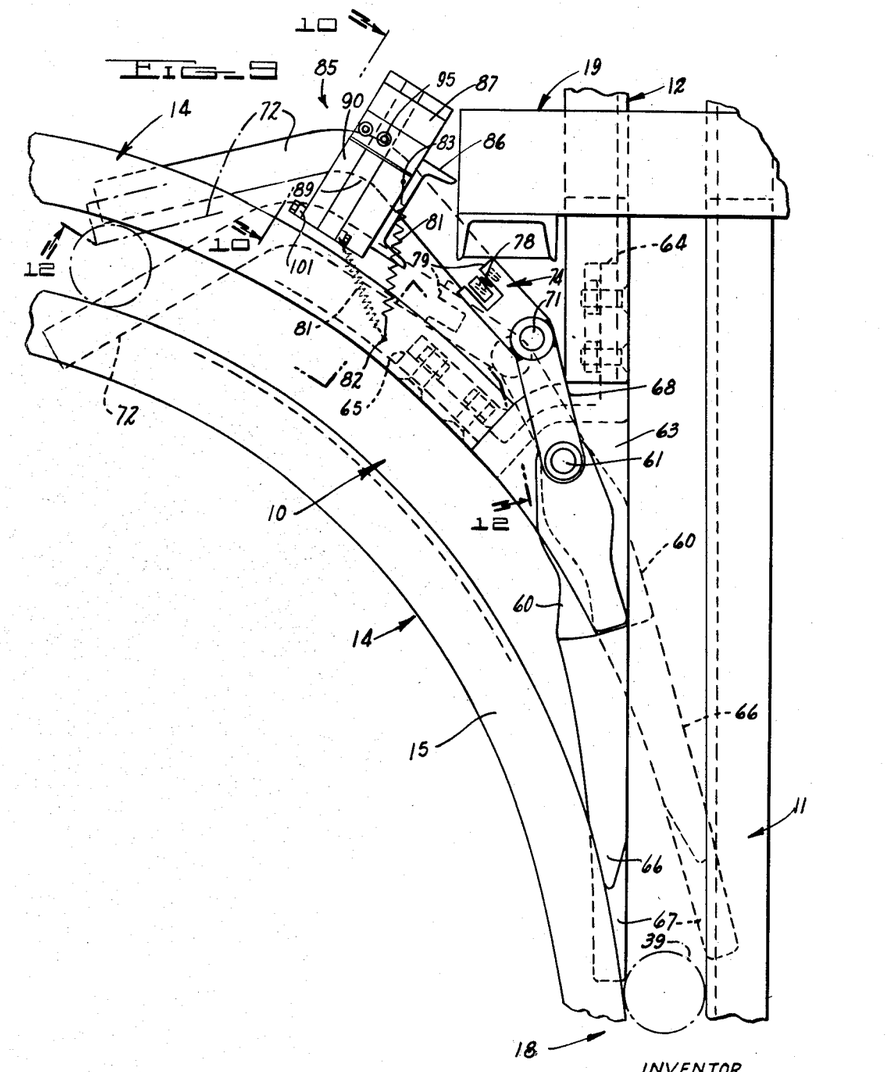
Fig. 9 is a fragmentary view showing the main operating components of the improved switch mechanism, different positions thereof being indicated in solid, dotted and dot-dash line, the view being in top plan.

A strong coil spring 81, anchored at one end 82 to the branch track section 14, is connected at its opposite end 83 to a medial point along the length of secondary tongue lever or arm 72, thus urging the tongue 60 in counterclockwise direction about its pivotal axis at 61, as viewed in Fig. 9. This is in the direction to swing the switch tongue 60 from the solid line position to the dotted line position of Fig. 9, opening the branch track section 14 to an advancing trolley 18 proceeding along main track section 11.

Figure 10:
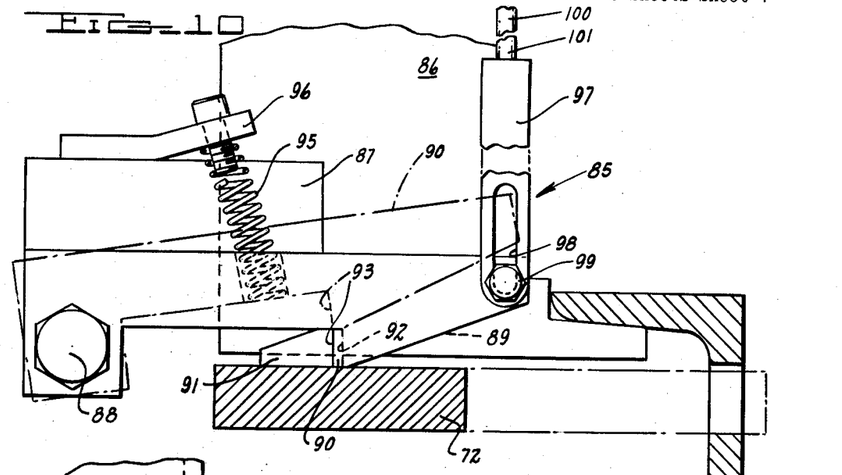
Fig. 10 is a view in vertical section and in enlarged scale along line 10—10 of Fig. 9, showing a switch latching sub-assembly of the mechanism.
Figure 11:
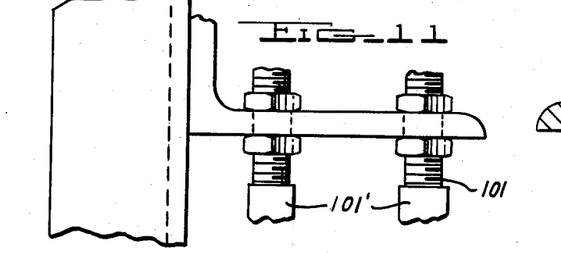
Fig. 11 is an end view of the latching device of Fig. 10, as viewed from the left of that figure.

The switch tongue 60 is held in the solid line position of Fig. 9, against the force of coil spring 81, by the latch device generally designated 85 in Figs. 9, 10 and 11, whose operation is also shown in Figs. 13 and 14.

The latch device 85 is mounted in fixed relation to the track structure of the conveyor by means of an upright hanger beam 86 secured to the track structure. A spacer block 87, secured to the hanger 86, is provided with a laterally extending pivot pin 88, upon which two generally similar detent or latch arms 89, 90 are hinged for movement in parallel vertical planes. In operation the latch arms 89, 90 releasably engage a holding lug or shoulder 91 welded on the top of the secondary switch control lever or arm 72.

The latch arms 89, 90 are each provided with a downwardly projecting latching shoulder, the respective shoulders being designated 92, 93. However, as shown in Figs. 10, 13 and 14, the distance of the shoulder 92 on the arm 89 from the pivot for that arm at 88 is greater than the corresponding distance of the shoulder 93 on arm 90 from the pivot, for a purpose to be described. Individual coil springs 95 act under compression between the respective latch arms 89, 90 and a fixed abutment 96 welded to the spacer block 87, urging the arms in a clockwise direction as viewed in Fig. 10.

Each of the arms 89, 90 has a cable connector 97 operatively engaged with its free end by means of an elongated slot 98 in the connector which receives a stud or bolt 99 applied to the arm. The connector 97 associated with arm 89 has a flexible cable 100 connected thereto; while the corresponding connector associated with latch arm 90 has a similar flexible cable 101 connected to it. These cables are of the well known Bowden wire type, including an outer sleeve sheath 101' which is fixedly mounted at its opposite ends and a wire cable element, slidable longitudinally in the sheath, which is secured to the parts controlled by the flexible cable, in this case the respective connectors for the latch arms 89, 90.

Reference should be made to Figs. 7 and 8, in conjunction with Fig. 1A, for a showing of the arrangements for controlling the operation of the latch arms 89 and 90 described above under the automatic action of trolleys 18, i. e., approaching the switch mechanism 10 and being gravitationally advanced along the branch track 14 after an operation on work supported thereby, respectively. As shown in Fig. 1A, a main track signal station, generally designated 103, is mounted adjacent main track section 11, forwardly of the switch mechanism of the invention, and a branch track signal station, generally designated 104, is similarly mounted adjacent the branch track secton 14, while a trolley stop device 105 is mounted for movement transversely of the section 14 just forwardly of the signal station 104. The device 105 is simply a lever 106 extending at an appropriate elevation over the branch track section 14, being appropriately pivoted at 107 and provided with a hand piece 108 whereby the lever may be swung upwardly, out of holding relation to the rear or trailing trolley dog 32 when the desired operation has been performed on trolley-supported work. This frees the trolley for gravitational travel along the slightly inclined track section 14, in which it passes the branch track signal station 104 and actuates the latter. It thereby signals to the latch device 85 the fact that a trolley is absent from the work station, and that if conditions are proper a succeeding trolley may be switched safely onto the branch track.

In view of the fact that the respective main track and branch track signal stations 103, 104, respectively, as shown in Figs. 7 and 8, are structurally and functionally the same as corresponding signal station shown and described in the copending application, Serial No. 513,452, they will be but briefly described and further reference may be had to that application for additional details. First considering Fig. 8, if a trolley is present at the work station adjoining manual trolley stop 105, and if the operation in question has been performed, the operator simply manipulates lever 106 to disengage it from the trolley dog, whereupon the trolley, and its associated bumper 22, proceed along track section 14. Its lug 44 engages a pivoted trip arm 110 at the signal station 104 which causes a cam extension 111 on this arm to shift a sliding rod 112 to the right, as viewed in Fig. 8. This in turn actuates the cable wire of the flexible cable 101, which elevates the latch arm 90 to the position shown in dot-dash line in Fig. 10, and in solid line in Fig. 13, freeing the shoulder 93 of this arm from holding engagement with the stop lug 91 on the secondary switch control arm 72. The power spring 81 thus shifts arm 72 slightly from the solid line position of Fig. 9 to the dot-dash position of that figure, and the arm 72 remains latched in this position by the second latch arm 89 of the device 85. The device is not further disengaged from arm 72 until an appropriate signal is received from the main track signal station 103. This is accomplished under the control of the lug 44 on the bumper and an adjustable tappet pin 45 on the bumper 22. Thus, as the lug 44 strikes a pivotal control arm 114 of the signal station or unit 103, it causes the arm to shift a rod 115, which in turn operates a flexible cable 116 to swing a second pivoted control arm 117 into a position in which it may be engaged and rocked by the pin 45. Rocking of arm 117 shifts a rod 118 connected to the flexible cable 100, and the tensioning of this cable elevates the second latch arm 89 of device 85. Upon disengagement of the second arm 89 from the stop lug 91 on secondary switch control lever 72 the latter is freed and the power spring 81 snaps it from the position shown in dot-dash line in Fig. 9 to the dotted line position.

In the event that it is desired not to switch certain of the trolleys 18 onto the branch track 14, the bumper pin 45 is simply placed in the dotted line position (Fig. 7) on the trolley bumper 22, such that the pin will not have reached the control arm 117 at the time it is swung by the flexible cable 116 in the manner described. Thus when the transverse bumper 44 passes control arm 114 the second control arm 117 will be restored to a position in which it cannot be engaged by the pin 45. As a result, flexible cable 100 will remain untensioned and latch arm 89 will remain in latching engagement with lever lug 91.

In the operation of the improved mechanism 10 and its associated parts, let it be assumed that the secondary switch control lever 72 is fully swung clockwise about the tongue pivot axis 61. This causes the stop or latch lug 91 on lever 72 to move successively beneath the stop shoulders 92, 93 on the respective latch arms 89, 90. As the shoulder 92 passes lug 91 its spring 95 snaps it down to holding or latching position. The shoulder 93 on latch arm 90 is not similarly urged to holding position until a slight further increment of reset or cocking movement of the arm 72 is accomplished. The purpose of this is to place the small coil spring 78 at the lost motion connection 74 between the primary switch tongue arm 68 and the secondary arm 72 under compression. The objective of this in turn is to insure that the switch nose 66 of tongue 60 shall be very snugly engaged against the track section 14, in the solid line position of Fig. 9, to insure a full track opening along main track sections 11 and 12 in this position of the parts for a reason later brought out.

As a trolley 18 advances along main track section 11, the main power chain 26 advancing the same picks up successive dogs 50 of the dog-lug units 49 on the transfer chain 47 (Figs. 1 and 2), causing the transfer chain to be positively advanced at all times about its generally triangular path in a horizontal plane. In so advancing the lugs 53 of the units 49 come into position between the pivoted trolley dogs 31, 32, but on the assumption that the switch unit 10 is closed (solid line position of Fig. 9) nothing happens, and the lugs part company with the trolleys as switch tongue 60 bars the same from track section 14.

Now assume that a trolley 18 previously advanced fully onto the branch track section 14 (having reset the switch tongue 60 in doing so, as will be described) is freed by operator manipulation of the work station stop device 105, and then pushed along track section 14. A mechanical signal is originated at the signal station 104 by a tensioning of the flexible cable 101. This elevates latch dog 90 to the position of Fig. 13, and the power spring 81 snaps secondary switch or lever arm 72 partially inwardly, i. e. counterclockwise in Figs. 1 and 9. It will be noted that the latch dog 90, so elevated, has its latch shoulder 93 resting on the top surface of secondary lever arm 72, i. e., unable to return to latching position until the arm is fully reset by a switched or diverted trolley. Thus it cannot nullify an arm releasing movement of the other latch dog 89, under actuation by the main track signal station 103. Arm 72 remains held by latch 89, and nothing further happens until another trolley 18 advancing on main track section 11 creates a signal at the main track signal station 103. This tensions the cable 100 and elevates the second latch dog 89 to the position shown in Fig. 14. Power spring 81 then snaps secondary lever 72 fully to the dotted line position of Fig. 9, shifting switch tongue 60 open to the corresponding dotted line position. The free rear extremity of lever 72 lies across the track opening.

The guide rollers 20, 39 and 40 engage tongue 60 to switch the signalling trolley 18, which proceeds around the curved track portion 15 toward the operating station and stop 105. However, as its forward guide roller 39 engages the free end of lever 72 it shifts the tongue, under the force of the positive trolley drive by chain 47 counterclockwise about its pivotal axis 61, automatically returning tongue 60 to the solid line position. The mechanism is now reset or recocked for a further similar cycle.

Referring to Figs. 10, 13 and 14, it is seen that the offset or displacement of the latch shoulders 92, 93 from one another (i. e., a distance of about ⅛th inch) serves two functions. In the first place, if both shoulders were equally spaced from the latch pivot at 88, the initially actuated dog 90 could return all the way down upon release of tension on its cable 101, hence nullify the signal that the branch track 14 is ready to receive another trolley. However, with the shoulder spacing shown, the dog 90 is lifted momentarily as a trolley passes branch track signal station 104 and, upon immediately moving down again, comes to rest on top of the stop lug 91, being thereby prevented from relatching and nullifying the signal.

In the second place the other dog 89, which is lifted every time a trolley, set to be switched, passes the main track signal station 103, must move freely all the way down again to relatch lug 91, in the event a trolley is still held on the branch track 14 by manual stop 105. In short, latch dog 90 insures the lateral clearance between the latch shoulder 92 of the other dog 89 which is necessary to permit the latter's full downward return to arm holding position, assuming there has been no signal to the dog 90 from branch station 104.

It is seen that if both shoulders 92, 93 were at substantially equal distance from the pivot 88, the dog 89 could hang on the tip of lug 91 and not return to latching position under this condition. If a trolley were now moved past branch track signal station 104, the switch tongue 60 would then swing over to the side position, out of timed relation with the movement of trolleys on the main track section 11. As a result, an unintended trolley could be switched out of the main line, or the switch tongue could be unlatched while the trolley is passing through, thereby causing a jam.

The importance of the spring biased, lost motion connection at 74 between the switch tongue 60 and its secondary lever 68 lies in the fact that it permits necessary movement of the lever 68, during which the control of positioning of the latch dogs 89, 90 is accomplished as above described, without attendant movement of the tongue 60. If such movement occurred, a non-signalling trolley, passing straight through main track 11, 12 without switching, would reset tongue 60 to latched position, despite the fact that a prior switched trolley had initiated an unlatching signal at branch station 104. The lost motion at 74 prevents such faulty operation. By the same token, it holds the branch controlled latch dog 90 out of nullifying engagement with secondary arm 72.

It is essential that the branch track signal station 104 be operated prior to or simultaneously with operation of main track signal station 103 to enable movement of the switch to diverting position. Normally the switch tongue 60 is in the straight-through position shown in solid line in Fig. 9. Signal station 104 is first operated by a trolley on branch track 14, after which signal station 103 is operated by another trolley on main track 11, or both stations may be operated simultaneously, for proper and successful switching. Otherwise, the latch device 85 will nullify switching action.

The invention affords a purely mechanical exit switch mechanism devoid of pneumatic and/or electrical parts which are likely to become faulty in operation or completely inoperative. The power for performing and controlling the switching operation is derived solely from the power of the main trolley engaging chain of the conveyor apparatus, which is itself powered in a conventional manner, as by caterpillar action. The parts are rugged and foolproof, and they are obviously of comparatively uncomplicated and inexpensive construction as well as being very inexpensively installed.

What I claim as my invention is:

1. An exit switch mechanism for a conveyor system characterized by divergent main and branch track sections and trolley or like units advanced by a forwarding mechanism along said main track section, said switch mechanism comprising a switch device movably mounted adjacent the zone of divergence of said track sections and operative in a first position to divert a unit from the main onto the branch section, a driven conveyor device receiving a unit from said forwarding mechanism and positively advancing the same into said branch section, said unit engaging said switch device in being so advanced to place said device in a second position to guide a succeeding unit for undiverted advance, signal devices located in advance and to the rear of said switch device, in reference to the diverted path of advance of a unit, said signal devices being successively actuated by advancing units, and means operatively connected to said respective signal devices and acting in response to said successive actuations to replace said switch device in said first position.

2. An exit switch mechanism for a conveyor system characterized by divergent main and branch track sections and trolley or like units advanced by a forwarding mechanism along said main track section, said switch mechanism comprising a switch device movably mounted adjacent the zone of divergence of said track sections and operative in a first position to divert a unit from the main onto the branch section, said unit engaging said switch device in advancing so as to place said device in a second position to guide a succeeding unit for undiverted advance, latch members normally holding said switch device in said second position, signal devices located in advance and to the rear of said switch device, in reference to the diverted path of advance of a unit, said signal devices being operatively connected to said respective latch members and successively actuated by advancing units, to replace said switch device in said first position.

3. An exit switch mechanism for a conveyor system characterized by divergent main and branch track sections and trolley or like units advanced by a forwarding mechanism along said main track section, said switch mechanism comprising a transfer conveyor driven by said forwarding mechanism to engage a unit and advance the same toward said branch track section, a switch device movably mounted adjacent the zone of divergence of said track sections and operative in a first position to divert a unit from the main onto the branch section, said unit engaging said switch device in being advanced by said transfer conveyor so as to place said device in a second position to guide a succeeding unit for undiverted advance, signal devices located in advance and to the rear of said switch device, in reference to the diverted path of advance of a unit, said signal devices being successively actuated by advancing units, and members operatively connected to said signal devices and acting in individual response to said respective successive actuations to replace said switch device in said first position.

4. An exit switch mechanism for a conveyor system characterized by divergent main and branch track sections and trolley or like units advanced by a forwarding mechanism along said main track section, said switch mechanism comprising a transfer conveyor driven by said forwarding mechanism to engage a unit and advance the same toward said branch track section, a switch device movably mounted adjacent the zone of divergence of said track sections and operative in a first position to divert a unit from the main onto the branch section, said unit engaging said switch device in being advanced by said transfer conveyor so as to place said device in a second position to guide a succeeding unit for undiverted advance, a latch device normally holding said switch device in said second position, signal devices located in advance and to the rear of said switch device, in reference to the diverted path of advance of a unit, said signal devices being successively actuated by advancing units, and means operatively connecting said latch device to said signal devices and acting in response to said successive actuations to release said latch device and replace said switch device in said first position.

5. An exit switch mechanism for a conveyor system characterized by divergent main and branch track sections along which trolley or like units travel, being automatically diverted from said main section onto said branch section by said exit switch mechanism, said mechanism comprising a switch tongue pivotally mounted adjacent the point of divergence of said sections and swingable between positions in which it respectively supports a unit for continued travel along said main track section and for divergent travel from the latter onto said branch section, spring means biasing said tongue toward said last named position, a latch device comprising latch elements normally holding said tongue in said first named position in opposition to said spring means, and means operatively connected to said latch device and operated by said traveling units in positions in advance of and to the rear of said switch mechanism, respectively, to successively operate said respective latch elements and release said latch device from tongue holding position.

6. An exit switch mechanism for a conveyor system characterized by divergent main and branch track sections along with trolley or like units travel, being automatically diverted from said main section onto said branch section by said exit switch mechanism, said mechanism comprising a switch tongue pivotally mounted adjacent the point of divergence of said sections and swingable between positions in which it respectively supports a unit for continued travel along said main track section and for divergent travel from the latter onto said branch section, spring means biasing said tongue toward said last named position, a latch device normally holding said tongue in said first named position in opposition to said spring means, said latch device comprising first and second latch members engageable with said tongue, and signal devices operatively connected to said latch device and operated by said traveling units in positions in advance of and to the rear of said switch mechanism, respectively, to successively release said latch members from tongue holding position.

7. An exit switch mechanism for a conveyor system characterized by divergent main and branch track sections along which trolley or like units travel, being automatically diverted from said main section onto said branch section by said exit switch mechanism, said mechanism comprising a switch tongue pivotally mounted adjacent the point of divergence of said sections and swingable between positions in which it respectively supports a unit for continued travel along said main track section and for divergent travel from the latter onto said branch section, spring means biasing said tongue toward said last named position, and a latch device including members successively disengageable from but normally holding said tongue in said first named position in opposition to said spring means, said tongue having an extension arm movable therewith and a secondary control arm having a pivotal lost motion connection to said extension arm, said secondary arm being engaged by said latch members to hold said tongue in opposition to said spring means.

8. An exit switch mechanism for a conveyor system characterized by divergent main and branch track sections along which trolley or like units travel, being automatically diverted from said main section onto said branch section by said exit switch mechanism, said mechanism comprising a switch tongue pivotally mounted adjacent the point of divergence of said sections and swingable between positions in which it respectively supports a unit for continued travel along said main track section and for divergent travel from the latter onto said branch section, spring means biasing said tongue toward said last named position, and a latch device normally holding said tongue in said first named position in opposition to said spring means, said tongue having an extension arm movable therewith and a secondary control arm having a pivotal lost motion connection to said extension arm, said secondary arm being engaged by said latch device to hold said tongue in opposition to said spring means, said latch device comprising first and second latch members normally engaging and successively disengageable from said secondary arm to release said tongue.

9. An exit switch mechanism for a conveyor system characterized by divergent main and branch track sections along which trolley or like units travel, being automatically diverted from said main section onto said branch section by said exit switch mechanism, said mechanism comprising a switch tongue pivotally mounted adjacent the point of divergence of said sections and swingable between positions in which it respectively guides a unit for continued travel along said main track section and for travel from the latter onto said branch section, spring means unidirectionally biasing said tongue toward said last named position, a driven conveyor receiving units from said main track section and positively driving the same along said branch track section, means successively operated by a unit switched by said tongue between said main and branch track sections to place the tongue in said last named position, and means engaged and operated by said units in its travel along said branch track section to restore said tongue to said first named position.

10. An exit switch mechanism for a conveyor system characterized by divergent main and branch track sections along which trolley or like units travel, being automatically diverted from said main section onto said branch section by said exit switch mechanism, said mechanism comprising a switch tongue pivotally mounted adjacent the point of divergence of said sections and swingable between positions in which it respectively guides a unit for continued travel along said main track section and for travel from the latter onto said branch section, spring means unidirectionally biasing said tongue toward said last named position, a device normally engaging and holding said tongue in said first named position, means operated by a unit switched by said tongue between said main and branch track sections to operatively disengage said tongue from said device and place the tongue in said last named position, and means engaged and operated by said unit in its travel along said branch track section to restore said tongue to said first named position in engagement with said holding device.

11. An exit switch mechanism for a conveyor system characterized by divergent main and branch track sections along which trolley or like units travel, being automatically diverted from said main section onto said branch section by said exit switch mechanism, said mechanism comprising a switch tongue pivotally mounted adjacent the point of divergence of said sections and swingable between positions in which it respectively guides a unit for continued travel along said main track section and for travel from the latter onto said branch section, spring means biasing said tongue toward said last named position, a holding latch device normally engaging and holding said tongue in said first named position, means operated by said units in traversing said main and branch track sections to operatively disengage said tongue from said device and place the tongue in said last named position, and means engaged and operated by said unit in its travel along said branch track section to restore said tongue to said first named position in engagement with said holding device, said holding latch device comprising first and second latch members engageable with said switch tongue, and means operated by said traveling unit in positions in advance of and to the rear of said switch mechanism, respectively, to successively release said latch members from tongue holding position.

12. A mechanism in accordance with claim 11, in which said tongue has an extension pivotally connected thereto by a yieldable lost motion connection, and in which said latch members are sequentially engaged with said extension in the restoration of said tongue, said lost motion connection yielding during said sequential engagement.

13. In a conveyor system characterized by a load carrying track, load carrying trolleys supported by said track for movement therealong, an endless driven power member having means engageable with said trolleys to so move the same, a further load carrying track in angular relation to said first track, and a connecting track member which supports said trolleys for movement from one track to the other, the improvement comprising a transfer mechanism including means engaging and continuously driven mechanically by said endless power member, and means operatively connected to and driven by said last named means to engage and propel said trolleys along said connecting track member.

14. In a conveyor system characterized by a load carrying track, load carrying trolleys supported by said track for movement therealong, an endless driven power member having means engageable with said trolleys to so move the same, a further load carrying track in angular relation to said first track, and a connecting track member which supports said trolleys for movement from one track to the other, the improvement comprising a transfer mechanism including an endless transfer member engaging and continuously driven mechanically by said endless power member, and means on said endless transfer member to engage and propel said trolleys along said track member.

15. In a conveyor system characterized by a load carrying track, load carrying trolleys supported by said track for movement therealong, an endless driven power member having means engageable with said trolleys to so move the same, a further load carrying track in non-meeting relation to said first track at a switch zone, and a track switch mounted at said switch zone for movement to and from a position in which it connects said tracks with one another and supports said trolleys for movement therealong from one track to the other, the improvement comprising a transfer mechanism including an endless transfer member engaging and continuously driven mechanically by said endless power member, means on said endless transfer member to engage and propel said trolleys along said track switch, and means driven mechanically by power transmitted through said endless power member and said transfer mechanism to control said track switch in its movement.

16. In a conveyor system characterized by a load carrying track, load carrying trolleys supported by said track for movement therealong, an endless driven power member having means engageable with said trolleys to so move the same, a further load carrying track in non-meeting relation to said first track at a switch zone, and a track switch mounted at said switch zone for movement to and from a position in which it connects said tracks with one another and supports said trolleys for movement therealong from one track to the other, the improvement comprising a transfer mechanism including an endless transfer member engaging and continuously driven mechanically by said endless power member, means on said endless transfer member to engage and propel said trolleys along said track switch, and means driven mechanically by power transmitted through said endless power member and said transfer mechanism to control said track switch in its movement, said last named means including signal devices adjacent said respective tracks which have means mechanically connecting the same to said switch to control the latter, said signal devices being engageable by trolleys moved by said power member and transfer member to actuate said respective connecting means.

17. In a conveyor system characterized by a load carrying track, load carrying trolleys supported by said track for movement therealong, an endless driven power member having means engageable with said trolleys to so move the same, a further load carrying track in angular relation to said first track, and a connecting track member which supports said trolleys for movement from one track to the other, the improvement comprising a transfer mechanism including an endless transfer chain having dog elements engaging and driven mechanically by said endless power member to drive said chain continuously, said chain being provided with further dog elements to engage and propel said trolleys along said track switch.

18. In a conveyor system characterized by a load carrying track, load carrying trolleys supported by said track for movement therealong, an endless driven power member having means engageable with said trolleys to so move the same, a further load carrying track in non-meeting relation to said first track at a switch zone, and a track switch mounted at said switch zone for movement to and from a position in which it connects said tracks with one another and supports said trolleys for movement therealong from one track to the other, the improvement comprising a transfer mechanism including an endless transfer chain having dog elements engaging and driven mechanically by said endless power member to drive said chain continuously, said chain being provided with further dog elements to engage and propel said trolleys along said track switch, and means driven mechanically by power transmitted through said endless power member and said transfer mechanism to control said track switch in its movement.

19. In a conveyor system characterized by a load carrying track, load carrying trolleys supported by said track for movement therealong, an endless driven power member having means engageable with said trolleys to so move the same, a further load carrying track in non-meeting relation to said first track at a switch zone, and a track switch mounted at said switch zone for movement to and from a position in which it connects said tracks with one another and supports said trolleys for movement therealong from one track to the other, the improvement comprising a transfer mechanism including an endless transfer chain having dog elements engaging and driven mechanically by said endless power member to drive said chain continuously, said chain being provided with further dog elements to engage and propel said trolleys along said track switch, and means driven mechanically by power transmitted through said endless power member and said transfer mechanism to control said track switch in its movement, said last named means including signal devices adjacent said respective tracks which have means mechanically connecting the same to said switch to control the latter, said signal devices being engageable by trolleys moved by said power member and transfer member to actuate said respective connecting means.

20. In a conveyor system characterized by a load carrying track, load carrying trolleys supported by said track for movement therealong, an endless driven power member having means engageable with said trolleys to so move the same, a further load carrying track in angular relation to said first track, and a track portion connecting said tracks and supporting said trolleys for movement from one track to the other, the improvement comprising an endless transfer chain to propel said trolleys positively along said track portion, said chain having vertically spaced elements respectively engaging said endless power member and said trolleys at different elevations for the drive of the chain from said power member and the drive of the trolleys from the chain.

21. In a conveyor system characterized by a load carrying track, load carrying trolleys supported by said track for movement therealong, an endless driven power member having means engageable with said trolleys to so move the same, a further load carrying track in non-meeting relation to said first track at a switch zone, and a track switch mounted at said switch zone for movement to and from a position in which it connects said tracks with one another and supports said trolleys for movement therealong from one track to the other, the improvement comprising an endless transfer chain to propel said trolleys positively along said track switch, said chain having vertically spaced elements respectively engaging said endless power member and said trolley at different elevations for the drive of the chain from said power member and the drive of the trolley from the chain, and means also driven mechanically from said endless power member to control said track switch in its movement.

22. In a conveyor system characterized by a load carrying track, load carrying trolleys supported by said track for movement therealong, an endless driven power member having means engageable with said trolleys to so move the same, a further load carrying track in non-meeting relation to said first track at a switch zone, and a track switch mounted at said switch zone for movement to and from a position in which it connects said tracks with one another and supports said trolleys for movement therealong from one track to the other, the improvement comprising an endless transfer chain to propel said trolleys positively along said track switch, said chain having vertically spaced elements respectively engaging said endless power member and said trolley at different elevations for the drive of the chain from said power member and the drive of the trolley from the chain, and means also driven mechanically from said endless power member to control said track switch in its movement, comprising an extension of said track switch, said trolley as propelled by said transfer chain on said switch engaging said extension to move the switch out of its position connecting said tracks.

23. In a conveyor system characterized by a load carrying track, load carrying trolleys supported by said track for movement therealong, an endless driven power member having means engageable with said trolleys to so move the same, a further load carrying track in non-meeting relation to said first track at a switch zone, and a track switch mounted at said switch zone for movement to and from a position in which it connects said tracks with one another and supports said trolleys for movement therealong from one track to the other, the improvement comprising an endless transfer chain to propel said trolleys positively along said track switch, said chain having vertically spaced elements respectively engaging said endless power member and said trolley at different elevations for the drive of the chain from said power member and the drive of the trolley from the chain, and means also driven mechanically from said endless power member to control said track switch in its movement, comprising an extension of said track switch mechanically connected for movement with the latter by a resilient lost motion connection, said trolley as propelled by said transfer chain on said switch engaging said extension to move the switch out of its position connecting said tracks.

24. In a conveyor system characterized by a load carrying track, load carrying trolleys supported by said track for movement therealong, an endless driven power member having means engageable with said trolleys to so move the same, a further load carrying track in non-meeting relation to said first track at a switch zone, and a track switch mounted at said switch zone for movement to and from a position in which it connects said tracks with one another and supports said trolleys for movement therealong from one track to the other, the improvement comprising means to propel said trolleys along said track switch, and an extension of said track switch mechanically connected to the latter by a resilient lost motion connection for movement with said switch, said trolleys as moved by said propelling means engaging said extension to move said track switch out of said connecting position of the latter.

25. In a conveyor system characterized by a load carrying track, load carrying trolleys supported by said track for movement therealong, an endless driven power member having means engageable with said trolleys to so move the same, a further load carrying track in non-meeting relation to said first track at a switch zone, and a track switch mounted at said switch zone for movement to and from a position in which it connects said tracks with one another and supports said trolleys for movement therealong from one track to the other, the improvement comprising means driven mechanically from said endless power member to propel said trolleys along said track switch, means driven mechanically by said propelling means to control said track switch in its movement, and an extension of said track switch mechanically connected to the latter by a resilient lost motion connection for movement with said switch, said trolleys as moved by said propelling means engaging said extension to move said track switch out of said connecting position of the latter.

26. In a conveyor system characterized by a load carrying track, load carrying trolleys supported by said track for movement therealong, an endless driven power member having means engageable with said trolleys to so move the same, a further load carrying track in non-meeting relation to said first track at a switch zone, and a track switch mounted at said switch zone for movement to and from a position in which it connects said tracks with one another and supports said trolleys for movement therealong from one track to the other, the improvement comprising a transfer mechanism including an endless transfer member engaging and continuously driven mechanically by said endless power member, and provided with means to engage and propel said trolleys along said track switch, and means driven mechanically by power transmitted through said endless power member and said transfer mechanism to control said track switch in its movement, said last named means including a control device adjacent said first track operated mechanically by trolleys moving along the same, a further control device adjacent said further track operated mechanically by trolleys moving along the latter, an extension of said track switch mechanically connected to the latter by a resilient lost motion connection for movement with said switch, and mechanical operating connections between said respective control devices and said extension.

27. In a conveyor system characterized by a load carrying track, load carrying trolleys supported by said track for movement therealong, an endless driven power member having means engageable with said trolleys to so move the same, a further load carrying track in non-meeting relation to said first track at a switch zone, and a track switch mounted at said switch zone for movement to and from a position in which it connects said tracks with one another and supports said trolleys for movement therealong from one track to the other, the improvement comprising a transfer mechanism including an endless transfer member engaging and continuously driven mechanically by said endless power member, and provided with means to engage and propel said trolleys along said track switch, and means driven mechanically by power transmitted through said endless power member and said transfer mechanism to control said track switch in its movement, said last named means including a control device adjacent said first track operated mechanically by trolleys moving along the same, a further control device adjacent said further track operated mechanically by trolleys moving along the latter, and mechanical operating connections between said respective control devices and said track switch to move said track switch to said connecting position only upon mechanical operation of both said control devices by trolleys on said respective first and further tracks, said operating connections including latch elements operatively connected to said respective control devices and positioned for restraining engagement with said track switch to hold the latter and said track switch for movement to said connecting position, said latch elements being successively movable out of said restraining position in response to successive operations of said respective control devices.

28. In a conveyor system characterized by a load carrying track, load carrying trolleys supported by said track for movement therealong, an endless driven power member having means engageable with said trolleys to so move the same, a further load carrying track in non-meeting relation to said first track at a switch zone, and a track switch mounted at said switch zone for movement to and from a position in which it connects said tracks with one another and supports said trolleys for movement therealong from one track to the other, the improvement comprising a transfer mechanism including an endless transfer member engaging and continuously driven mechanically by said endless power member, and provided with means to engage and propel said trolleys along said track switch, and means driven mechanically by power transmitted through said endless power member and said transfer mechanism to control said track switch in its movement, said last named means including a control device adjacent said first track operated mechanically by trolleys moving along the same, a further control device adjacent said further track operated mechanically by trolleys moving along the latter, an extension of said track switch mechanically connected to the latter by a resilient lost motion connection for movement with said switch, and mechanical operating connections between said respective control devices and said extension to move said track switch to said connecting position only upon mechanical operation of both said control devices by trolleys on said respective first and further tracks, said operating connections including latch elements operatively connected to said respective control devices and positioned for restraining engagement with said track switch extension to hold the latter and said track switch from movement to said connecting position, said latch elements being successively movable out of said restraining position in response to successive operations of said respective control devices.

29. In a conveyor system characterized by a load carrying track, load carrying trolleys supported by said track for movement therealong, an endless driven power member having means engageable with said trolleys to so move the same, a further load carrying track in angular relation to said first track, and a track portion connecting said tracks and supporting said trolleys for movement from one track to the other, the improvement comprising an endless transfer chain to propel said trolleys positively along said track portion, said chain having vertically spaced elements respectively engaging said endless power member and said trolleys at different elevations for the drive of the chain from said power member and the drive of the trolleys from the chain, said vertically spaced elements being arranged in vertically aligned pairs spaced along the length of said chain.

30. In a conveyor system characterized by a load carrying track, load carrying trolleys supported by said track for movement therealong, an endless driven power member having means engageable with said trolleys to so move the same, a further load carrying track in angular relation to said first track, and a track portion connecting said tracks and supporting said trolleys for movement from one track to the other, the improvement comprising an endless transfer chain to propel said trolleys positively along said track portion, said chain having vertically spaced elements respectively engaging said endless power member and said trolleys at different elevations for the drive of the chain from said power member and the drive of the trolleys from the chain, said vertically spaced elements being arranged in vertically aligned pairs spaced along the length of said chain, the respective elements of said pairs projecting laterally of said chain for driven and driving engagement with said power member and said trolleys, respectively.

31. In a conveyor system in accordance with claim 20, the further improvement in which said trolley moving means on said endless driven power member comprises longitudinally spaced driving elements thereon engageable with said trolleys at the elevation of their engagement by the trolley engaging elements of said endless transfer chain.

32. In a conveyor system in accordance with claim 29, the further improvement in which said trolley moving means on said endless power driven power member comprises longitudinally spaced driving elements thereon engageable with said trolleys at the elevation of their engagement by the trolley engaging elements of said endless transfer chain.

33. In a conveyor system in accordance with claim 30, the further improvement in which said trolley moving means on said endless driven power member comprises longitudinally spaced driving elements thereon engageable with said trolleys at the elevation of their engagement by the trolley engaging elements of said endless transfer chain.

References Cited in the file of this patent

UNITED STATES PATENTS

| Number | Name | Date |
|---|---|---|
| 1,296,989 | McMeeken | Mar. 11, 1919 |
| 1,297,680 | Kanak | Mar. 18, 1919 |
| 1,562,416 | Peebles | Nov. 17, 1925 |
| 1,625,501 | Robertson | Apr. 19, 1927 |
| 2,116,430 | Gordon | May 3, 1938 |
| 2,260,528 | Levy | Oct. 28, 1941 |
| 2,612,847 | Burrows | Oct. 7, 1952 |
| 2,688,936 | Brooks | Sept. 14, 1954 |

FOREIGN PATENTS

| Number | Country | Date |
|---|---|---|
| 600,717 | France | Nov. 14, 1925 |